US008682739B1

(12) United States Patent  (10) Patent No.: US 8,682,739 B1
Feinstein  (45) Date of Patent: Mar. 25, 2014

(54) IDENTIFYING OBJECTS IN VIDEO

(75) Inventor: Brian J. Feinstein, Mercer Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 478 days.

(21) Appl. No.: 12/846,925

(22) Filed: Jul. 30, 2010

(51) Int. Cl.
*G06Q 30/00* (2012.01)

(52) U.S. Cl.
USPC .......................................... 705/26.1

(58) Field of Classification Search
USPC ................................. 705/26.1, 27.1
See application file for complete search history.

(56) References Cited

U.S. PATENT DOCUMENTS

| 7,000,242 | B1 * | 2/2006 | Haber .............................. 725/43 |
| 2008/0288855 | A1 * | 11/2008 | Issler et al. .................... 715/205 |
| 2008/0306999 | A1 * | 12/2008 | Finger et al. ................ 707/104.1 |
| 2009/0198487 | A1 * | 8/2009 | Wong et al. ........................ 704/4 |
| 2010/0070483 | A1 * | 3/2010 | Delgo et al. .................. 707/706 |
| 2010/0205541 | A1 * | 8/2010 | Rapaport et al. .............. 715/753 |

OTHER PUBLICATIONS

Anonymous, "That's it! launches first ever 'click-to-commerce shoppable image' technology on LA.com with america's next top model adrianne curry," PR Newswire, Jan. 14, 2009.*
U.S. Appl. No. 12/779,254, filed May 13, 2010, entitled "Content Collection Search with Robust Content Matching."
U.S. Appl. No. 12/378,599, filed Feb. 18, 2009, entitled "Method and System for Image Matching."
U.S. Appl. No. 12/321,235, filed Jan. 16, 2009, entitled "System and Method to Match Images."
U.S. Appl. No. 11/732,858, filed Apr. 4, 2007, entitled "Method and System for Searching for Information on a Network in Response to an Image Query Sent by a User From a Mobile Communications Device."

* cited by examiner

*Primary Examiner* — Brandy A Zukanovich
(74) *Attorney, Agent, or Firm* — Thomas | Horstemeyer, LLP

(57) ABSTRACT

Systems and methods for identifying products in video are disclosed. A video containing at least one object is received, and video frames are extracted from the video for analysis. At least one object is extracted from one or more of the video frames to determine whether it corresponds to a product. Hyperlinks can be generated and embedded in a user interface to allow a user to purchase the product and/or retrieve additional information about the product.

21 Claims, 7 Drawing Sheets

IDENTIFYING OBJECTS IN VIDEO

BACKGROUND

Many videos contain products or representations of products. Videos are often used in a user interface, such as a network page encoded in an electronic commerce system and transmitted to a client for rendering in a client application. Many videos containing representations of products are not interactive in that they do not include hyperlinks or other user interface elements allowing a user to interact with the video or a user interface in which the video is rendered in order to obtain additional information about the depicted products. Relevance based hyperlinks provided with videos in a user interface often fail to identify or link to specific products appearing in the video.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

In the following discussion, first a general description of the system and its components is provided, followed by a discussion of the operation of the same. Disclosed herein are systems and methods for identifying products that appear in a video and generating links that are associated with the identified products. As discussed herein, a video can include one or more video frames that may be synced with audio. Embodiments of this disclosure can also generate a user interface that incorporates the video as well as links allowing a user to purchase and/or view additional information about the products. As discussed herein, a product can include any good, service, family of products or services and any combination thereof that can be made accessible via an electronic commerce system.

Figure 1:
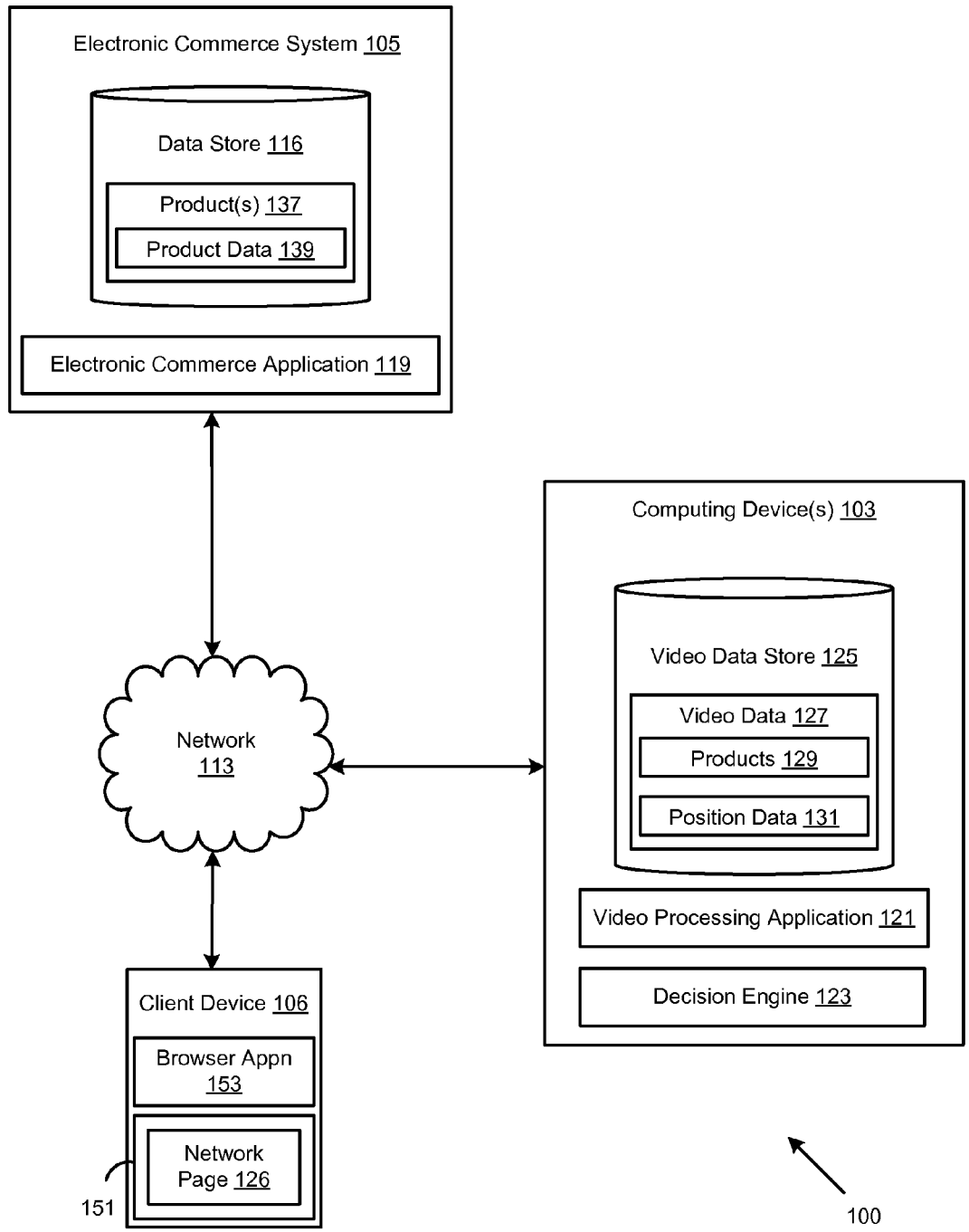
FIG. 1 is a drawing of a networked environment according to various embodiments of the present disclosure.

With reference to FIG. 1, shown is a networked environment 100 according to various embodiments. The networked environment 100 includes a computing device 103 in communication with an electronic commerce system 105 as well as at least one client device 106. The network 113 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise, for example, a cloud computing resource, a grid computing resource, and/or any other distributed computing arrangement. Such computing devices 103 may be located in a single installation or may be dispersed among many different geographical locations. As one example, each of the disclosed components executed in the computing device 103 can be executed in different computing devices 103 in various locations in one or more data centers. However, for purposes of convenience, the computing device 103 is referred to herein in the singular. Even though the computing device 103 is referred to in the singular, it is understood that a plurality of computing devices 103 may be employed in the various arrangements as described above. The electronic commerce system 105 can also be implemented in hardware or a cluster of hardware that is similar in nature to the computing device 103.

The components executed on the computing device 103 include, for example, video processing application 121, a decision engine 123, and other systems, applications, services, processes, engines, or functionality not discussed in detail herein. Likewise, the components executed on the electronic commerce system 105 include, for example, the electronic commerce application 119 and other systems, applications, services, processes, engines, or functionality not discussed in detail herein. The electronic commerce application 119 is executed in order to facilitate the viewing and/or purchasing of items and products over the network 113. The electronic commerce application 119 can direct the shipment and/or delivery of products to a customer from a fulfillment center or the like. The electronic commerce application 119 also performs various backend functions associated with the online presence of a merchant in order to facilitate the online purchase of items.

For example, the electronic commerce application 119 generates network pages, such as web pages or other types of network content, that are provided to a client device 106 in response to requests for the purposes of selecting items for purchase, rental, download, lease, or other form of consumption and to perform other tasks as will be described. In other embodiments, the electronic commerce application 119 facilitates the generating of data for display on a user interface rendered by another type of application executed on a client device 106.

The video processing application 121, which can be executed on the computing device 103 either independently of or in conjunction with the electronic commerce system 105, facilitates processing videos that contain objects that can be identified as products available via the electronic commerce application 119. Accordingly, the electronic commerce application 119, video processing application 121, and/or another system can generate a user interface for a client device 106 that can display a video user interface as well as links and/or other information about products that the video processing application 121 can identify as being depicted in the video. The decision engine 123 can be executed in the computing device 103 to facilitate identification of objects in a video.

With regard to the data store 116 associated with the electronic commerce system 105, the data stored therein can include, for example, a catalog that includes a listing of various products 137 that are available for browsing and/or purchasing via the electronic commerce application 119. The products 137 in the catalog of the data store 116 can also be associated with the product data 139, which can be stored in various forms as can be appreciated. The product data 139 can include stock keeping unit (SKU) identifiers, product imagery (e.g., stock imagery), product videos, model numbers, serial numbers, product attributes, product descriptions, other products with which the product is associated, product categories with which the product is associated, and other information as can be appreciated. The product data 139 can also include videos available via a site that serves video and/or a content delivery network with which a particular product is associated. Additionally, the product data 139 can include entries that identify a product class and/or hierarchy in which the product 137 can be classified. The data store 116 can also include other data that may be employed to facilitate an electronic commerce application 119, but such data is not discussed in detail herein. Additionally, it should be appreciated that the data store 116 can be implemented in one or more separate computing devices that may be located in a separate installation or location.

With regard to the video data store 125 associated with the computing device 103, the data stored thereon can include, for example, video data 127 that is associated with videos processed by the computing device 103 according to embodiments of this disclosure. In one embodiment, video data 127 can include information about products 129 identified in various videos as well as position data 131. In some embodiments, the information about products 129 identified in a video can include a product category and/or product type that is identified in a video. Position data 131 can include data that can be generated by the video processing application 121 regarding the position of products 129 appearing in a video processed by the video processing application 121. In one embodiment, position data 131 can facilitate the generating of links associated with products 129. Like the data store 116, the video data store 125 can be implemented in one or more separate computing devices that may be located in a separate installation or location.

The client device 106 is representative of a plurality of client devices 106 that may be coupled to the network 113. The client device 106 may comprise, for example, a processor-based system such as a computer system. Such a computer system may be embodied in the form of a desktop computer, a laptop computer, a personal digital assistant, a mobile device (e.g. cellular telephone, smart phone, etc.), set-top box, music players, web pads, tablet computer systems, or other devices with like capability. The client device 106 can include a display device 151 upon which various network pages 126 and other content may be rendered.

The client device 106 may be configured to execute various applications such as a browser application 153 and/or other applications. The browser application 153 may be executed in a client device 106, for example, to access and render network pages 126, such as web pages, or other network content served up by the computing device 103 and/or other servers. The client device 106 may be configured to execute an application specifically tailored to access resources of the computing device 103 and/or other applications as can be appreciated. In embodiments of the present disclosure, a user on a client 106 can view video content processed by the video processing application 121 as well as purchase and/or view products via the electronic commerce application 119 by manipulating a user interface rendered on the client 106.

The client device 106 can also execute an application customized with interact with the electronic commerce application 119 and/or video processed by the video processing application 121. As one example, the client 106 may comprise a mobile device executing a mobile application that includes client side code that that facilitates rendering of a user interface with which the user can interact to view and/or purchase products available the electronic commerce system 105 as well as interact with video content.

Next, a general description that provides some examples of the operation of the various components of the networked environment 100 is provided. The following discussion includes non-limiting examples of identifying objects within video content and associating these objects with products that may be available via an electronic commerce system 105. Additionally, embodiments of this disclosure can facilitate the generating of a user interface that displays video content as well as information about the products identified therein and/or hyperlinks that allow a user to access additional information or purchase the product via the electronic commerce system 105.

The video processing application 121 can extract video frames from a video and perform various image recognition and/or text recognition techniques in order to identify and delineate the various objects shown in the video. In one embodiment, the video processing application 121 extract a subset of the video frames comprising the video and perform an analysis on the subset of the video frames. In another embodiment, the video processing application 121 can extract all of the video frames associated with a video and perform an analysis to identify and extract the objects shown within the video. The video processing application 121 can then determine whether the objects extracted from a video can be identified as products that can be available via an electronic commerce system 105. Accordingly, the electronic commerce application 119 and/or video processing application 121 can facilitate generating a user interface for display on a client device 106 that incorporates the video as well as additional information about the identified products. In some embodiments, a user interface can incorporate the video and hyperlinks that allow a user to click and/or tap on a hyperlink associated with the product to view additional information about the product.

In some embodiments, the video processing application 121 can determine whether objects extracted from a video can be associated with a category of products available via the electronic commerce system 105. As one example, the video processing application 121 may be able to identify a type of product associated with an object depicted in a particular video, but may be unable to identify a specific model of the depicted product. Accordingly, the video processing application 121 can associate the object with a product category.

The video processing application 121 can also analyze an audio track associated with a video. In one embodiment, the video processing application 121 can employ speech to text techniques to convert speech contained in an audio track to text. The resultant text can then be used to facilitate identifying a product associated with objects appearing in the video. In one embodiment, the video processing application 121 may be able to identify a product class and/or product category associated with an object appearing in a video, as is described above. Accordingly, the video processing application 121 can then convert speech that exists in an audio track to text and attempt to determine whether additional information about the product appears in the audio track to further narrow the identification of the product within the video. In other embodiments, the video processing application 121 may be unable to identify a product and/or a product category within the video by analyzing video frames extracted from the video. Accordingly, the video processing application 121 may be able to determine products appearing in the video by analyzing the audio track in this way.

Figure 2:
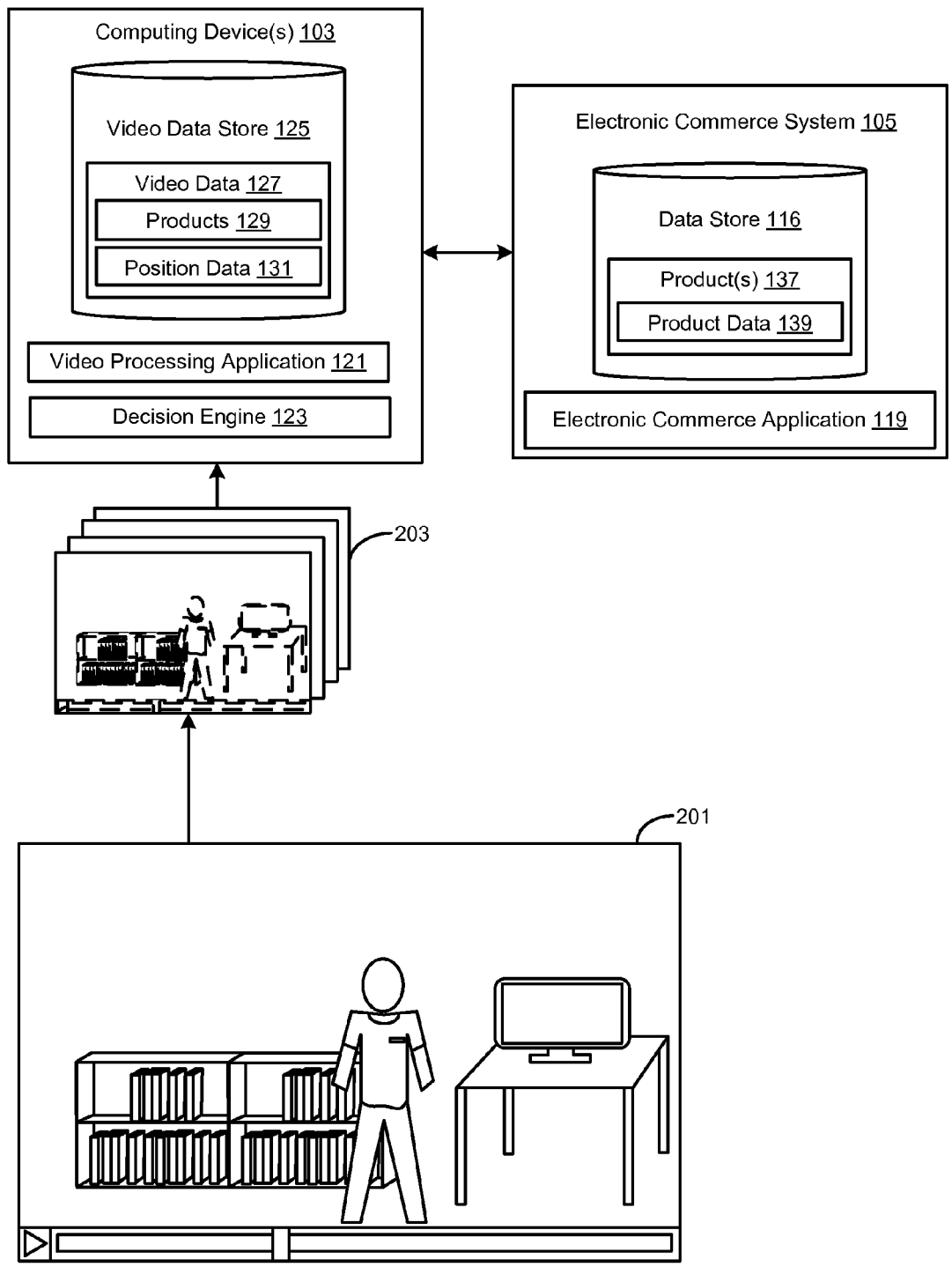
FIG. 2 is a drawing of an example video processed by the video processing application according to various embodiments of the present disclosure.

Accordingly, reference is now made to FIG. 2, which depicts one example of a video 201 that can be processed by the video processing application 121 as described herein. The example video 201 shown in FIG. 2 depicts various objects therein, and the video 201 can be provided to a computing device 103 executing the video processing application 121 so that products associated with one or more of the objects can be identified and links generated that correspond to the depicted products. In the subsequent drawings, shown are various examples of a video user interface that incorporates the example video 201 shown in FIG. 2 as well as various other user interface elements facilitated by the analysis performed by the video processing application 121.

In the depicted example, the video 201 contains various objects that the video processing application 121 can identify and attempt to associate with products available via the electronic commerce system 105. The video processing application 121 can, in one embodiment, extract video frames 203 comprising a video 201 and perform image processing techniques to identify objects in the extracted video frames 203. As one example, the video processing application 121 can extract video frames 203 from the video 201 and perform edge recognition techniques to identify an edge associated with objects in each of the extracted video frames 203. Accordingly, the object can be extracted from the video frames 203 and the video processing application 121 can perform image recognition and/or text recognition techniques on at least one representation of the extracted object to determine whether it is associated with a product and/or product category available via the electronic commerce application 119.

As one example, the video processing application 121 can identify a particular object from one or more of the extracted video frames 203 and perform image recognition and/or text recognition techniques to compare a representation of the object or text recognized within the object against product data 139 (e.g., product imagery, product logos, descriptions, tags, etc.) associated with products 137 in the electronic commerce system 105. As another example, the video processing application 121 can identify an object in one or more of the extracted video frames 203 and perform image recognition and/or text cognition techniques to identify a product category with which to associate the object. For example, the video processing application 121 may be unable to determine a specific product with which to associate an extracted object, but the video processing application 121 may be able to determine the type of product depicted in the video as well as identify a product logo visible on the object. In this non-limiting example scenario, the video processing application 121 can associated the object with a class of products available from a manufacturer associated with the product logo.

The video processing application 121 can perform this process on a plurality of video frames associated with the video and track the position of the identified products throughout the running time of the video. As noted above, the video processing application 121 can employ various image recognition and/or text recognition techniques on the extracted video frames 203 to identify and delineate the various objects from one another in the extracted video frames 203, and then compare representations of the objects in the extracted video frames 203 associated with products 137 available via the electronic commerce application 119. Various image recognition and/or text recognition techniques that facilitate extracting an object from an image and then associating the image with a product available in an electronic commerce application 119 are disclosed in U.S. patent application Ser. No. 12/779,254 entitled "Content Collection Search with Robust Content Matching," filed May 13, 2010, U.S. patent application Ser. No. 12/321,235 entitled "System and Method to Match Images," filed Jan. 16, 2009, U.S. patent application Ser. No. 11/732,858 entitled "Method and System for Searching for Information on a Network in Response to an Image Query Sent by a User From a Mobile Communications Device," filed Apr. 4, 2007, and U.S. patent application Ser. No. 12/378,599 entitled "Method and System for Image Matching," filed Feb. 18, 2009, each of which is hereby incorporated by reference herein in its entirety.

The video processing application 121 can identify products depicted in a video 201 and track an edge or perimeter of the depicted product in the extracted video frames 203. In this way, the position of the product within the video 201 can be tracked throughout the running time of the video 201 and/or the portion of the video being analyzed by the video processing application 121. Position data 131 can be stored in the video data store 125 and associated with products 129 that are identified in the video 201.

In some embodiments, the video processing application 121 can identify representative video frames associated with the video 201 and employ the decision engine 123 to facilitate identification of objects within the video as well as products that are associated with the objects. As one example, the representative video frames can be identified by the video processing application 121 by determining video frames 203 in which a particular object is prominent or clearly represented. The video processing application 121 can then invoke the decision engine 123 to facilitate association of the object with a product available via the electronic commerce system 105. In one embodiment, the decision engine 123 can provide the representative video frames to at least one user, who can submit a vote to the decision engine 123 regarding products 137 represented in the representative frames. Accordingly, the decision engine 123 can aggregate a plurality of votes from a plurality of users and associate an object in the representative video frame with a product receiving the highest percentage of votes. The decision engine 123 can also calculate a confidence score associated with a particular identification of a product by a plurality users. Accordingly, the video processing application 121 can be tuned to accept identifications of a product in a video 201 that have a confidence score above a predetermined threshold.

In some embodiments, the video processing application 121 can rank identified products according to their prominence in the video 201. In one embodiment, the video processing application 121 can identify the prominence of a product appearing in a video by ranking products according to an amount of time in which the product appears in the video 201. In other words, the video processing application 121 can rank products depicted in the video 201 according to a percentage of the video frames 203 in which the product appears. The video processing application 121 can also identify prominence of the product within the video 201 by identifying the size of the product relative to other products appearing in the video 201. In one embodiment, the video processing application 121 can identify prominence of products in the video 201 by identifying products that appear larger relative to other products as more prominent. The video processing application 121 can also determine prominence of products depicted in a video 201 by employing a combination of relative size of the product and a percentage of video frames 203 in which the product appears.

In some embodiments, the video processing application 121 can employ the decision engine 123 in order to determine prominence of the products appearing within the video 201. As one example, the video processing application 121 can identify representative video frames of the video 201, as is described above, and provide the representative video frames of the video 201 to the decision engine 123 so that users can vote on which products and/or objects are most prominent in the video 201. As another example, users can provide a ranked list of products appearing in the video 201 according to their prominence. Accordingly, the decision engine 123 can aggregate a plurality of votes from a plurality of users and use voting results to determine which products are most prominent in the video 201.

Figure 3:
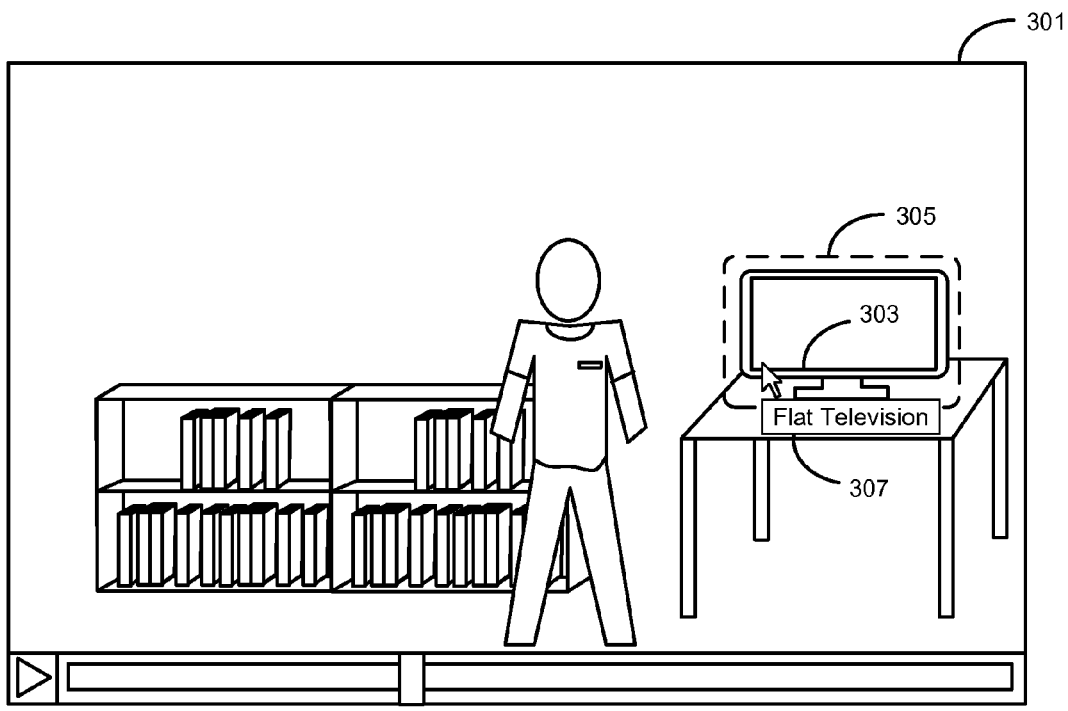
FIGS. 3-6 are drawings of example user interfaces rendered by a client in the networked environment of FIG. 1 according to various embodiments of the present disclosure.

Having discussed various ways in which a product appearing in a video 201 can be identified as well as ranked by prominence, reference is now made to FIG. 3, which depicts an example of a video user interface 301 generated by the electronic commerce application 119 and/or the video processing application 121 that can be rendered on a client device 106 according to an embodiment of this disclosure. In the depicted non-limiting example, the user interface can comprise a network page 126 that is rendered by a browser application 153 executed on a client device 106. In another embodiment, the user interface can comprise a video player in a mobile application 155 executed on a client device 106b that is a mobile device. As noted above in reference to FIG. 2, the video processing application 121 can identify products and/or categories of products that are depicted in a video 201. Additionally, the video processing application 121 can track the position of products within the video 201 by identifying an edge or perimeter associated with the product and tracking its location throughout the running time of the video 201.

Accordingly, a video user interface 301 generated by the electronic commerce application 119, the video processing application 121, or any other system that incorporates video processed according to embodiments of this disclosure, can comprise a video player user interface element that includes a video layer in which the video 201 can be placed. Additionally, an interactive layer can be overlaid on the video layer, and a user can interact with the interactive layer with an input device via a client device 106. The interactive layer can provide hyperlinks and/or additional information about a particular product and/or product category associated with an object represented in a video 201 to a user.

In one embodiment, if a user places a mouse pointer over a particular object in the video 201 that has been identified as a product and/or a product category available via the electronic commerce system 105, the interactive layer can highlight the product by generating an outline 305 around the identified product and/or an object associated with a product category. The outline 305 can be displayed as a part of the interactive layer of the video user interface 301 while the video 201 is viewed by the user on a client device 106. The interactive layer can also display a hyperlink 307 as well as other information about the product and/or product category. The hyperlink 307 can allow the user to purchase a product and/or view additional information about the product and/or product category via the electronic commerce system 105. In some embodiments, a hyperlink 307 can be generated that allows a user to access additional information about the product and/or product category via the electronic commerce system 105, a manufacturer's site, and/or any other site. In another embodiment, a user on a client device 106 having a touch input device can tap on a product depicted in the video 201, and the interactive layer can render the outline 305 as well as provide access one or more hyperlinks associated with the object. In some embodiments, the video user interface 301 can employ the prominence data generated by the video processing application 121 and highlight only a subset of the products appearing in the video 201 according to a prominence ranking.

In this way, a user can view a video as well as follow hyperlinks placed in an interactive layer of the video player user interface to purchase and/or view additional information about the products shown therein. In one example, the user can place a pointer over various products depicted in the video 201, and the interactive layer can highlight corresponding products as well as provide hyperlinks with which the user can interact. In the depicted example, a hyperlink 307 associated with the depicted product 305 can be embedded in the network page 126 and associated with the location of the product 503 within the video 201.

Figure 4:
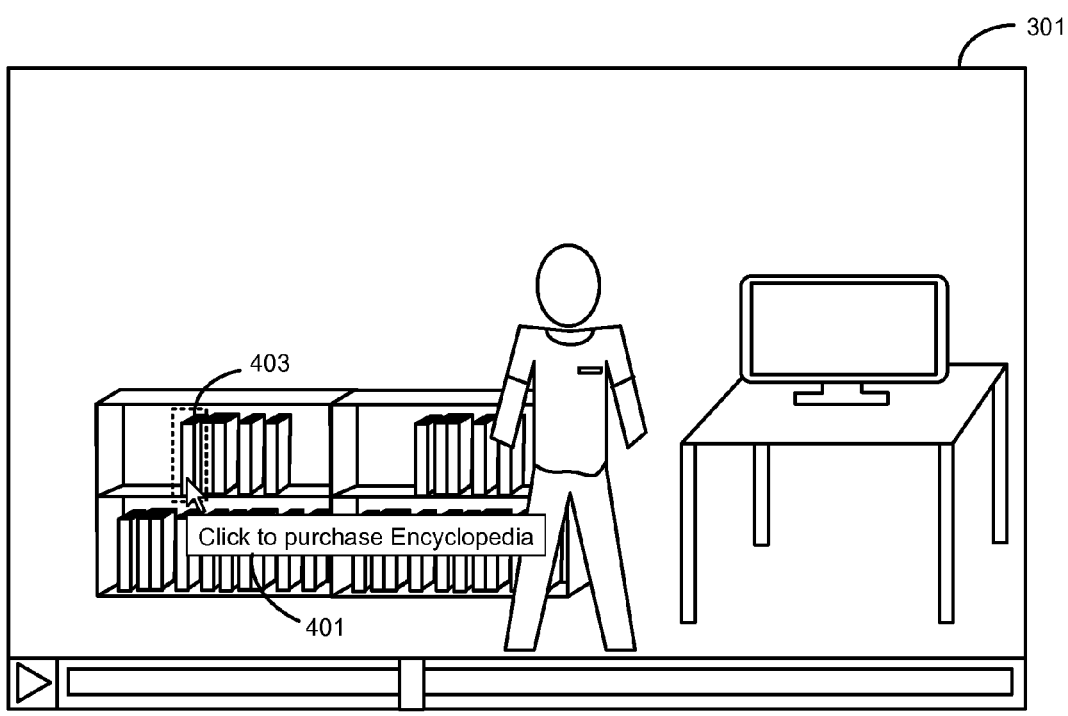

Continuing the example of FIG. 3, reference is now made to FIG. 4, which depicts the video user interface 301 that includes a video 201 processed by the video processing application 121. In the depicted non-limiting example, the video user interface 301 includes a video player user interface element that includes a video layer and an interactive layer overlaid on the video layer with which a user on a client device 106 may interact. FIG. 4 illustrates how a different hyperlink 401 associated with a different product 403 can be shown in the interactive layer that can be overlaid onto the video layer. Additionally, the product 403 can be highlighted with an outline or other highlighting or outlining mechanism as can be appreciated.

Figure 5:
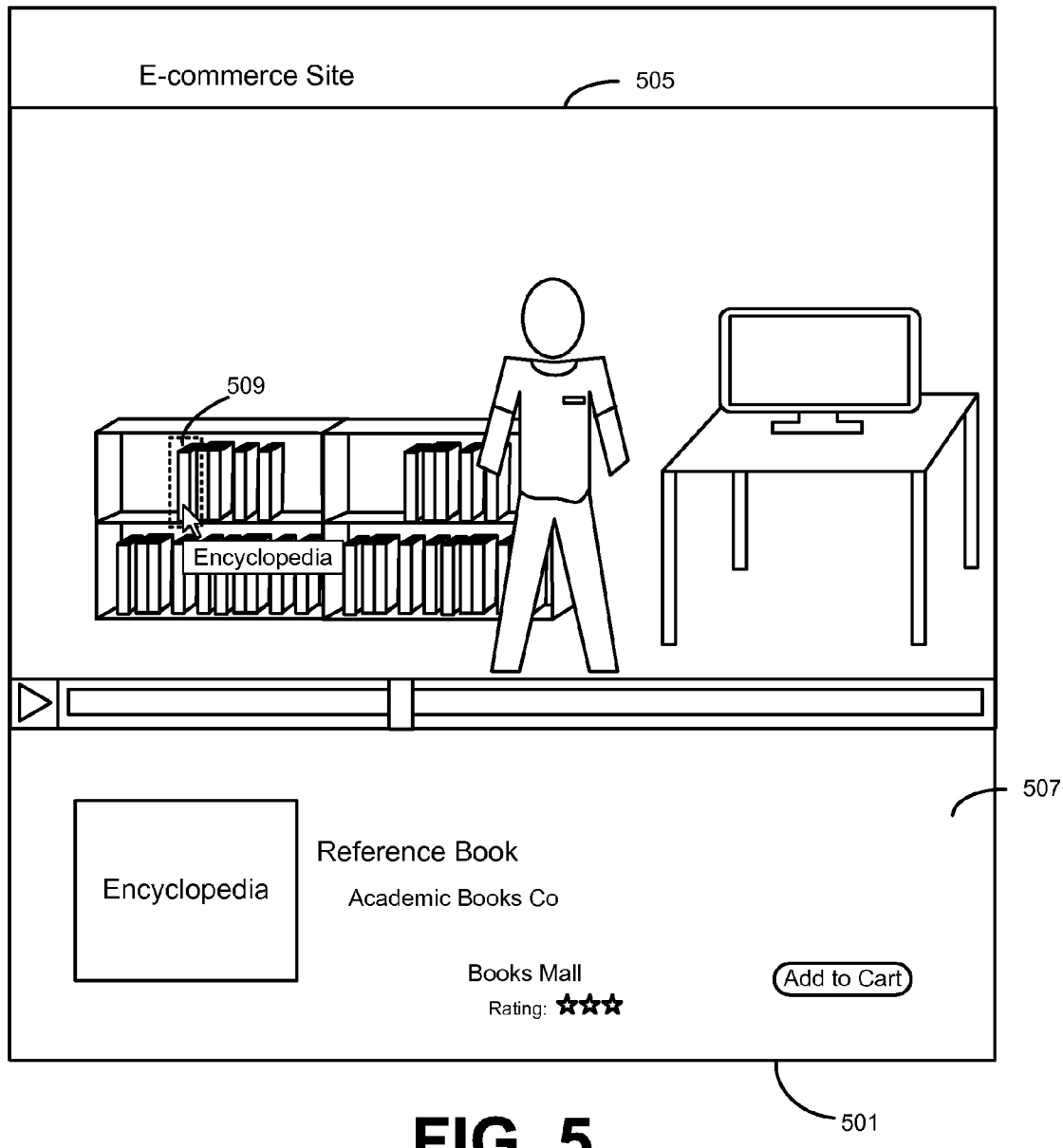

Reference is now made to FIG. 5, which depicts an alternative video user interface 501 that incorporates the video 201 processed by the video processing application 121. The example of FIG. 5 can be a network page 126 rendered by a browser application 151 on a client device 106. In the depicted video user interface 501, the electronic commerce application 119 can encode for display on the client device 106 a network page 126 that includes a video player user interface element 505 as well as a product information pane 507 that can be asynchronously updated by the electronic commerce application 119 as a user interacts with an interactive layer of the video player user interface element 505. In one embodiment, the video user interface 501 can include asynchronous Javascript and extensible markup language (AJAX) code that can be encoded in a network page 126 and rendered in a browser application 151. In one embodiment, the electronic commerce application 119 or other content delivery network site can generate such a network page 126 and then provide content updates to the product information pane 507 in response to the interactions of the user with the video user interface 501.

As in the examples of FIGS. 3 and 4, the video user interface 501 can highlight and/or outline product when a user selects and/or interacts with the product 509 with an input device on a client device 106. In the depicted embodiment, the product information pane 507 can be updated when a user selects a product 509 appearing in the video 201. The product information pane 507 can be updated with product data, pricing, product description, ratings, purchasing user interface elements, and other data as can be appreciated. In this way, a user on a client device 106 can interact with the interactive layer of the video player user interface element 505 and view product information associated with a particular product in the video, and the product information pane 507 can be asynchronously updated without interrupting viewing of the video.

Figure 6:
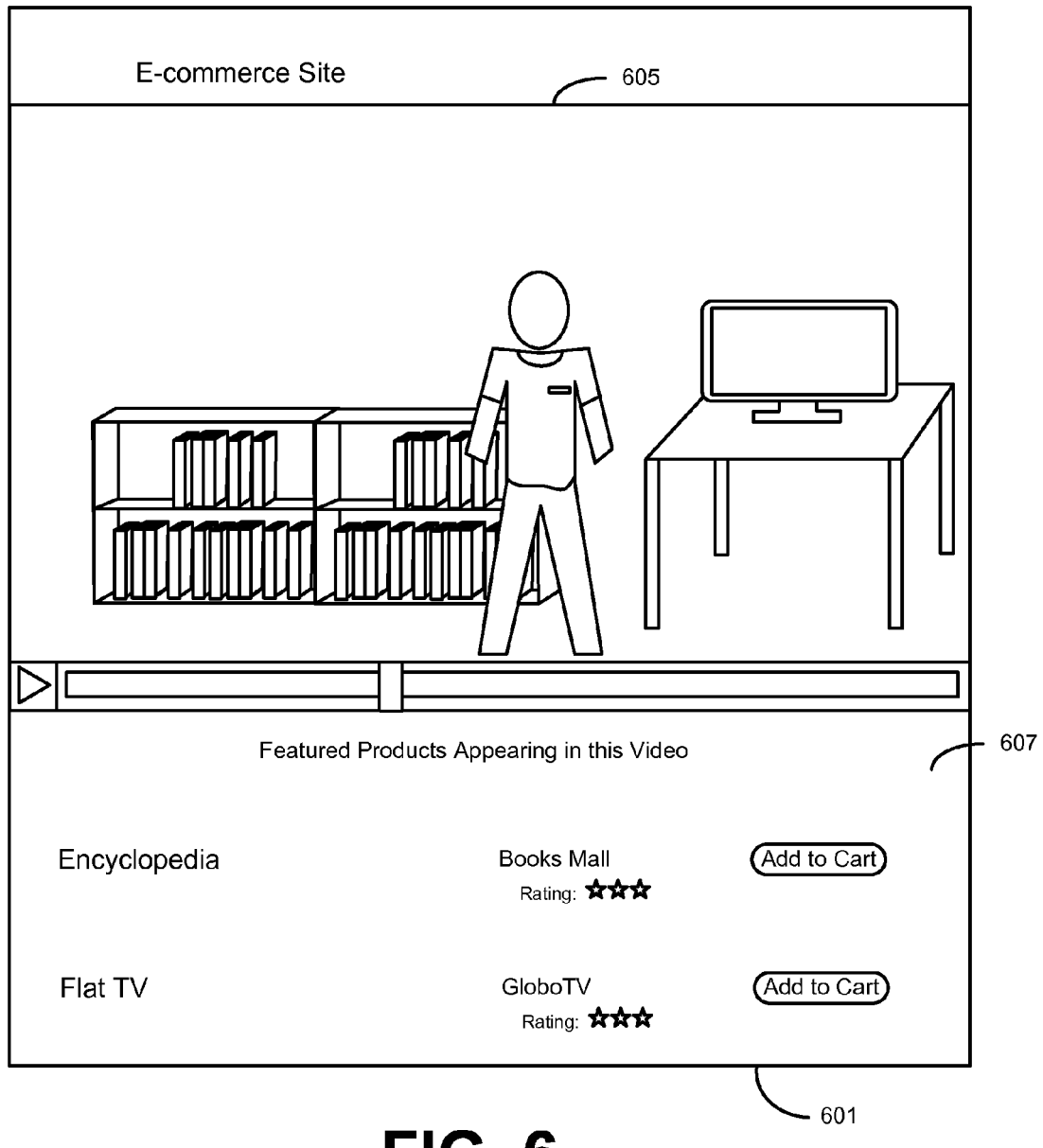

Reference is now made to FIG. 6, which depicts an alternative video user interface 601 that incorporates the video 201 processed by the video processing application 121. As in the previous example, the example of FIG. 6 can be a network page 126 (FIG. 1) rendered by a browser application 151 (FIG. 1) on a client device 106. In the depicted video user interface 601, the electronic commerce application 119 can encode for display on the client device 106 a network page 126 that includes a video player user interface element 505 that facilitates viewing of a video 201 processed by the video processing application 121. In the depicted example, the video user interface 601 also includes a product information pane 607 that can be populated with products appearing in the video 201.

As one example, the product information pane 607 can be populated by the electronic commerce application 119 with products appearing in the video that are most prominent. As noted above, the video processing application 121 can identify a ranked list of products appearing in a video by their prominence, which can be related to the amount of time a product appears in the video and/or the relative size of the product as depicted in the video. Accordingly, the product information pane 607 can be populated with a subset of the products appearing in the video ranked by their prominence.

Figure 7:
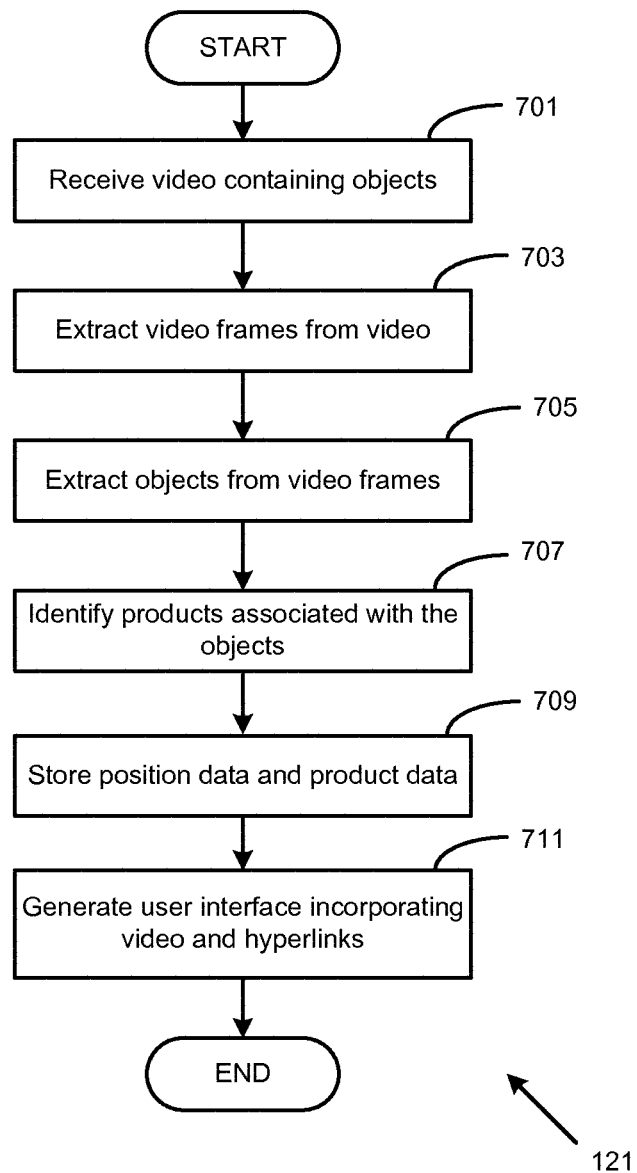
FIG. 7 is a flowchart illustrating one example of functionality implemented as portions of the video processing application executed in a computing device in the networked environment of FIG. 1 according to various embodiments of the present disclosure.

With reference to FIG. 7, shown is a flowchart that provides one example of the operation of various embodiments of the video processing application 121 according to various embodiments. It is understood that the flowchart of FIG. 7 merely provides examples of the many different types of functional arrangements that may be employed to implement the operation of the video processing application 121 as described herein. As an alternative, the flowchart of FIG. 7 may be viewed as depicting examples of steps of methods implemented in the computing device 103 (FIG. 1) according to one or more embodiments.

With specific reference to FIG. 7, beginning with box 701, the video processing application 121 receives a video that contains at least one object. In box 703, the video processing application 121 extracts at least a subset of the video frames from the video for analysis. In box 705, the video processing application 121 can extract objects located in one or more of the extracted video frames. As noted above, the video processing application 121 can perform edge recognition techniques in order to identify, delineate, and extract objects in a video frame corresponding to a video.

In box 707, the video processing application 121 can identify products available via an electronic commerce application 119 that are associated with the objects from the extracted video frames. In one example, the video processing application 121 can attempt to match an object in a video frame with imagery associated with a product. In another example, the video processing application 121 can perform text recognition techniques to identify textual artifacts in a video frame and attempt to match the text with textual data associated with the product. In another example, the video processing application 121 can identify meta data or other tags associated with a video under analysis to associate the objects therein with products available via an electronic commerce system 105 (FIG. 1).

In box 709, the video processing application 121 stores data regarding products appearing in the video as well as their position within the various video frames comprising the video. In some embodiments, the video processing application 121 can store data regarding the prominence of products within the video, as is discussed above. In box 711, a user interface can be generated that incorporates the video into the user interface as well as hyperlinks associated with the product that a user may follow to retrieve additional information about the products and/or purchase the products via an electronic commerce system 105.

Figure 8:
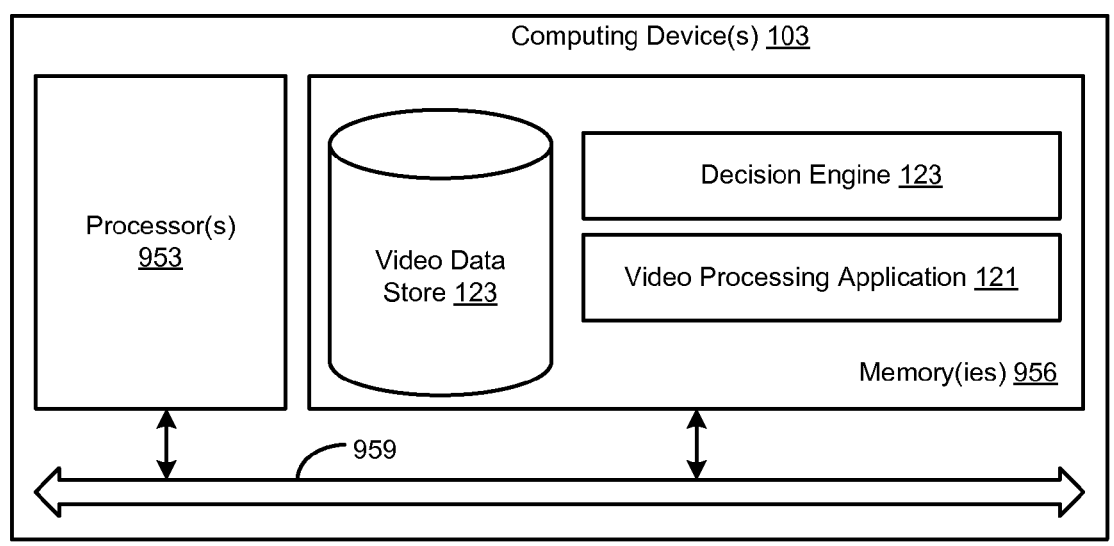
FIG. 8 is a schematic block diagram that provides one example illustration of a computing device employed in the networked environment of FIG. 1 according to various embodiments of the present disclosure.

With reference to FIG. 8, shown is a schematic block diagram of the computing device 103 according to an embodiment of the present disclosure. The computing device 103 includes at least one processor circuit, for example, having a processor 953 and a memory 956, both of which are coupled to a local interface 959. To this end, the computing device 103 may comprise, for example, at least one server computer or like device. The local interface 959 may comprise, for example, a data bus with an accompanying address/control bus or other bus structure as can be appreciated.

Stored in the memory 956 are both data and several components that are executable by the processor 953. In particular, stored in the memory 956 and executable by the processor 953 are the video processing application 121, decision engine 123, and potentially other applications. Also stored in the memory 956 may be the video data store 125 and other data. In addition, an operating system may be stored in the memory 956 and executable by the processor 953.

It is understood that there may be other applications that are stored in the memory 956 and are executable by the processors 953 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 956 and are executable by the processor 953. In this respect, the term "executable" means a program file that is in a form that can ultimately be run by the processor 953. Examples of executable programs may be, for example, a compiled program that can be translated into machine code in a format that can be loaded into a random access portion of the memory 956 and run by the processor 953, source code that may be expressed in proper format such as object code that is capable of being loaded into a random access portion of the memory 956 and executed by the processor 953, or source code that may be interpreted by another executable program to generate instructions in a random access portion of the memory 956 to be executed by the processor 953, etc. An executable program may be stored in any portion or component of the memory 956 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 956 is defined herein as including both volatile and nonvolatile memory and data storage components. Volatile components are those that do not retain data values upon loss of power. Nonvolatile components are those that retain data upon a loss of power. Thus, the memory 956 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 953 may represent multiple processors 953 and the memory 956 may represent multiple memories 956 that operate in parallel processing circuits, respectively. In such a case, the local interface 959 may be an appropriate network 113 (FIG. 1) that facilitates communication between any two of the multiple processors 953, between any processor 953 and any of the memories 956, or between any two of the memories 956, etc. The local interface 959 may comprise additional systems designed to coordinate this communication, including, for example, performing load balancing. The processor 953 may be of electrical or of some other available construction.

Although the video processing application 121, decision engine 123 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 8 shows the functionality and operation of an implementation of portions of the video processing application 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 953 in a computer system or other system. The machine code may be converted from the source code, etc. If embodied in hardware, each block may represent a circuit or a number of interconnected circuits to implement the specified logical function(s).

Although the flowchart of FIG. 8 shows a specific order of execution, it is understood that the order of execution may differ from that which is depicted. For example, the order of execution of two or more blocks may be scrambled relative to the order shown. Also, two or more blocks shown in succession in FIG. 8 may be executed concurrently or with partial concurrence. Further, in some embodiments, one or more of the blocks shown in FIG. 8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the video processing application 121, that comprises software or code can be embodied in any non-transitory computer-readable medium for use by or in connection with an instruction execution system such as, for example, a processor 953 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:
   code that receives a video, the video comprising a plurality of video frames;
   code that, in response to receiving the video comprising a plurality of video frames, extracts at least a subset of the video frames;
   code that identifies a set of objects in the subset of the video frames;
   code that performs image recognition on individual ones of the set of objects;
   code that compares a result of the image recognition with product imagery associated with a set of products available via an electronic commerce system;
   code that performs text recognition on individual ones of the set of objects;
   code that compares a result of the text recognition with textual data associated with the set of products available via the electronic commerce system;
   code that ranks the set of products in the subset of the video frames according to a prominence of individual ones of the set of products in the video, the prominence based upon a percentage of the subset of the video frames in which individual ones of the set of products appears and a size of individual ones of the set of products relative to other products appearing in the subset of the video frames;
   code that generates a respective hyperlink associated with individual ones of the set of products;
   code that inserts individual hyperlinks in an interactive layer, the interactive layer overlaid on a video layer in a video player user interface, wherein individual hyperlinks are placed at a position corresponding a location of a corresponding one of the set of products;

code that identifies at least a subset of the set of products based on the prominence ranking; and code that displays in an information pane, the identified at least a subset of the set of products in a ranked list based on the prominence ranking.

2. A system, comprising:

at least one computing device; and a video processing application executable in the at least one computing device, the video processing application comprising:

logic that extracts at least a subset of a set of video frames associated with a video;

logic that identifies at least one object in the subset of the video frames;

logic that identifies at least one product that corresponds to the at least one object;

logic that ranks the least one product in the subset of the video frames according to a prominence of the at least one product in the video, the prominence based upon a percentage of the subset of the video frames in which the at least one product appears and a size of the at least one product relative to other products appearing in the subset of the video frames; and logic that identifies at least a subset of the at least one product based on the prominence; and logic that displays in an information pane, the identified at least a subset of the at least one product in a ranked list based on the prominence ranking.

3. The system of claim 2, wherein the at least one product is a product category.

4. The system of claim 2, further comprising logic that generates at least one hyperlink associated with the at least one product.

5. The system of claim 4, further comprising logic that generates a video player user interface, the video player user interface displaying a subset of the at least one hyperlink according to the prominence of the corresponding at least one product in the video.

6. The system of claim 2, wherein the logic that identifies at least one product that corresponds to the at least one object further comprises:

logic that performs image recognition on the at least one object; and logic that compares a result of the image recognition with product imagery associated with at least one product.

7. The system of claim 2, wherein the logic that identifies at least one product that corresponds to the at least one object further comprises:

logic that performs character recognition on text associated with the at least one object; and logic that compares a result of the character recognition with textual data associated with products in a data store accessible to the at least one computing device.

8. The system of claim 2, wherein the logic that identifies at least one product that corresponds to the at least one object further comprises:

logic that converts an audio track associated with the video into a text track; and logic that compares the text track with textual data associated with products in a data store accessible to the at least one computing device.

9. The system of claim 2, wherein the logic that identifies at least one product that corresponds to the at least one object further comprises:

logic that identifies at least one representative video frame corresponding to the at least one object; and logic that transmits the at least one representative video frame to a decision engine, the decision engine configured to provide at least one recommendation of an identity of the at least one product based at least in part upon a plurality of votes regarding the at least one recommendation from a plurality of users.

10. The system of claim 9, wherein the decision engine further comprises logic that provides a confidence score associated with the at least one recommendation.

11. The system of claim 2, further comprising logic that encodes for display a video player user interface, the video player user interface comprising a video player having an interactive layer overlaid onto a video layer, the interactive layer comprising the at least one hyperlink corresponding to the at least one product and the video layer displaying the video.

12. The system of claim 11, wherein the interactive layer further comprises:

logic that places a hyperlink in the interactive layer in an area corresponding to a product appearing in the video when the product is visible in the video player user interface; and logic that removes the hyperlink corresponding to the product when the product is not visible in the video player user interface.

13. A method, comprising the steps of:

extracting, via at least one of one or more computing devices, at least a subset of a set of video frames associated with a video;

identifying, via at least one of the one or more computing devices, at least one object in the subset of the video frames;

identifying, via at least one of the one or more computing devices, at least one product available via an electronic commerce system that corresponds to the at least one object;

generating, via at least one of the one or more computing devices, at least one hyperlink associated with the at least one product;

ranking, via at least one of the one or more computing devices, the at least one product in the subset of the video frames according to a prominence of the at least one product in the video, the prominence based upon a percentage of the subset of the video frames in which the at least one product appears and a size of the at least one product relative to other products appearing in the subset of the video frames;

encoding for display, via at least one of the one or more computing devices, a video player user interface, the video player user interface comprising a video player having an interactive layer overlapping with a video layer, the interactive layer comprising the at least one hyperlink corresponding to the at least one product and the video layer displaying the video;

identifying, via at least one of the one or more computing devices, at least a subset of the at least one product based on the prominence; and displaying in an information pane, via at least one of the one or more computing devices, the identified at least a subset of the at least one product in a ranked list based on the prominence ranking.

14. The method of claim 13, wherein the at least one product is a product category.

15. The method of claim 13, wherein the step of identifying at least one product that corresponds to the at least one object further comprises:
    performing image recognition on the at least one object in the at least one computing device; and
    comparing, in the at least one computing device, a result of the image recognition with product imagery associated with products in a data store accessible to the at least one computing device.

16. The method of claim 13, wherein the step of identifying at least one product that corresponds to the at least one object further comprises:
    performing character recognition on text associated with the at least one object in the at least one computing device; and
    comparing, in the at least one computing device, a result of the character recognition with textual data associated with products in a data store accessible to the at least one computing device.

17. The method of claim 13, wherein the step of identifying at least one product that corresponds to the at least one object further comprises:
    converting, in the at least one computing device, an audio track associated with the video into a text track; and
    comparing, in the at least one computing device, the text track with textual data associated with products in a data store accessible to the at least one computing device.

18. The method of claim 13, wherein the step of identifying at least one product that corresponds to the at least one object further comprises:
    identifying, in the at least one computing device, at least one representative video frame corresponding to the at least one object; and
    generating, in the at least one computing device, at least one recommendation of an identity of the at least one product, the at least one recommendation based at least upon a plurality of votes submitted by a plurality of users.

19. The method of claim 18, further comprising generating, in the at least one computing device, a confidence score associated with the at least one recommendation.

20. The method of claim 13, wherein the interactive layer comprises the at least one hyperlink corresponding to the at least one product positioned at a location corresponding to the at least one product in the video layer.

21. The method of claim 20, wherein the step of encoding for display the interactive layer further comprises:
    placing a hyperlink in the interactive layer in an area corresponding to a product appearing in the video when the product is visible in the video player user interface; and
    removing the hyperlink corresponding to the product when the product is not visible in the video player user interface.

* * * * *

UNITED STATES PATENT AND TRADEMARK OFFICE
CERTIFICATE OF CORRECTION

PATENT NO.         : 8,682,739 B1                                    Page 1 of 1
APPLICATION NO.    : 12/846925
DATED              : March 25, 2014
INVENTOR(S)        : Brian J. Feinstein It is certified that error appears in the above-identified patent and that said Letters Patent is hereby corrected as shown below:

In the Claims:

Column 13, line 1, insert the word --to--, to read as follows: --links are placed at a position corresponding to a location of--.

Column 13, line 20, insert the word --at--, to read as follows: --logic that ranks the at least one product in the subset of the--.

Signed and Sealed this
Thirty-first Day of March, 2015

Michelle K. Lee
*Director of the United States Patent and Trademark Office*